(12) United States Patent
Pierson, Jr.

(10) Patent No.: US 6,195,346 B1
(45) Date of Patent: Feb. 27, 2001

(54) METHOD AND SYSTEM FOR PROCESSING AN HDLC MESSAGE

(75) Inventor: Forrest L. Pierson, Jr., Dallas, TX (US)

(73) Assignee: MCI Communications Corporation, Washington, DC (US)

(*) Notice: Subject to any disclaimer, the term of this patent is extended or adjusted under 35 U.S.C. 154(b) by 0 days.

(21) Appl. No.: 09/097,996

(22) Filed: Jun. 16, 1998

(51) Int. Cl.[7] .............................. H04L 12/66; H04L 12/56
(52) U.S. Cl. .......................... 370/352; 370/395; 370/466; 370/474; 370/522
(58) Field of Search ..................................... 370/351, 352, 370/356, 395, 465, 466, 468, 470, 471–474, 476, 503, 522, 528

(56) References Cited

U.S. PATENT DOCUMENTS

| 5,237,569 | * | 8/1993 | Sekihata et al. | 370/394 |
|---|---|---|---|---|
| 5,606,558 | * | 2/1997 | Daniel et al. | 370/395 |
| 5,862,136 | * | 1/1999 | Irwin | 370/395 |
| 5,878,045 | * | 3/1999 | Timbs | 370/466 |
| 5,889,773 | * | 3/1999 | Stevenson, III | 370/352 |
| 5,930,253 | * | 7/1999 | Brueckheimer et al. | 370/395 |
| 5,987,034 | * | 11/1999 | Simon et al. | 370/465 |
| 6,021,134 | * | 2/2000 | Hiraiwa et al. | 370/474 |

* cited by examiner

Primary Examiner—Seema S. Rao

(57) ABSTRACT

A method and system for processing a High level Data Link Control (HDLC) message despite the occurrence of a frame slip event in an Asynchronous Transfer Mode (ATM) receiver avoiding re-transmission of an HDLC message when a frame slip event occurs during reception of an HDLC message. In one embodiment, an ATM receiver receives an ATM cell, where the ATM cell carries one or more T1 payloads. Each T1 payload contains a plurality of timeslots, including an HDLC timeslot. The HDLC timeslot is read for each T1 payload prior to unloading each T1 payload from the ATM cell. The plurality of timeslots within each T1 payload are sent to a switch matrix, where the timeslots are de-multiplexed. The HDLC message is carried in the HDLC timeslot over a plurality of ATM cells and the HDLC message is processed despite the occurrence of a frame slip event.

19 Claims, 6 Drawing Sheets

HDLC Message Processing

T1 Emulation over an ATM Network

T1 Frame

Extended Superframe

HDLC Message Structure

ATM Cell Structure

Two T1 Frames carried in a single ATM cell

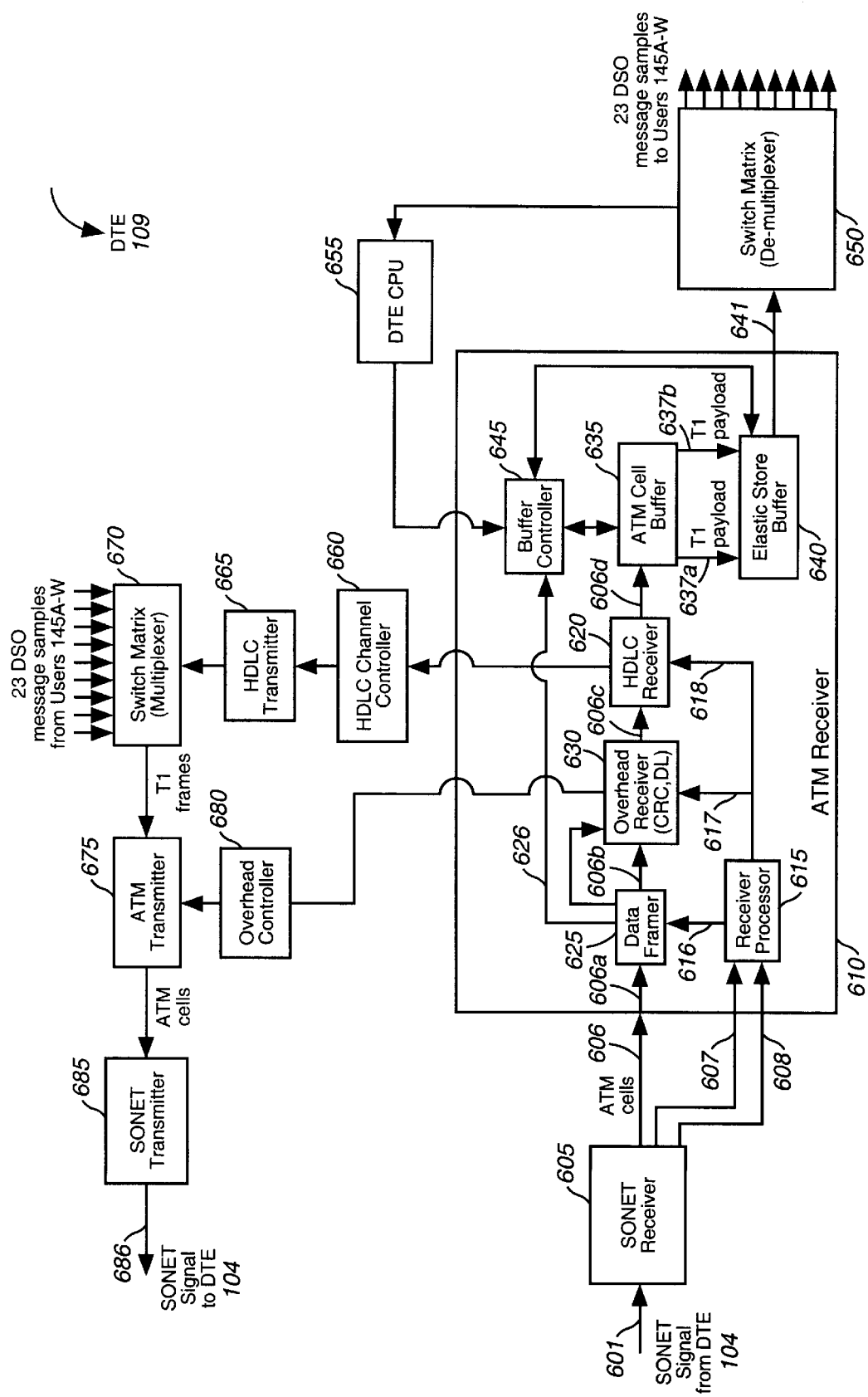
FIG. 6 DTE Block Diagram with HDLC message processing

HDLC Message Processing

METHOD AND SYSTEM FOR PROCESSING AN HDLC MESSAGE

CROSS REFERENCE TO RELATED APPLICATIONS

This patent application is related to the following commonly owned, copending U.S. patent applications:

1. "Method and System for Unloading T1 Payloads from ATM Cells", Ser. No. 09/097,755, now pending, by Forrest Pierson, filed concurrently herewith and incorporated herein by reference;
2. "Method, Apparatus, and Computer Program Product for Interfacing a TDM Link with a Cell-Switched Network", Ser. No. 09/097,754, now pending, by Forrest Pierson, filed concurrently herewith and incorporated herein by reference; and
3. "Method and System for Emulating a T1 Link Over an ATM Network", Ser. No. 09/099,671, now pending, by Forrest Pierson, filed concurrently herewith and incorporated herein by reference.

BACKGROUND OF THE INVENTION

1. Field of the Invention

The present invention relates generally to voice and data communications, and in particular, to emulating a T1 communications link over an Asynchronous Transfer Mode (ATM) communications network.

2. Related Art

A communications network serves to transport information among a number of locations. The information is usually presented to the network in the form of time domain electrical signals and can represent any combination of voice, video, or computer data. A typical communications network consists of various physical sites called "nodes", interconnected by conduits called "links". Each link carries information from one node to another node. End user nodes contain data terminating equipment (DTE) for combining, separating, and transforming data and voice. As such, a DTE can be a voice switch, data switch, or a combination of the two. A series of non-DTE nodes interconnected to each other with ATM links is often referred to as an ATM cloud. A DTE is typically connected to the ATM cloud at one point, and may be connected with an ATM link, other types of data links including frame relay, or digital time domain multiplexed (TDM) communications links such as T1. When an ATM cloud node is connected to a DTE over a non-ATM link, it is typically called circuit emulation.

T1 (also known as DS1) is one type of a TDM communications link. T1 is a synchronous link capable of carrying 24 DS0 channels which are TDM and transmitted over a single physical line. A DS0 channel is a 64 kilobits per second (64 Kbps) channel, which is the world wide standard for digitizing voice conversation. The 64 Kbps bit rate is chosen because an analog voice signal can be adequately represented by a digital data stream if sampled at a rate of 8000 samples per second. If each voice sample is digitized using 8 bits, this results in a digital data stream of 64 Kbps.

A T1 link transmits one T1 frame 8000 times per second (or one frame every 125 $\mu$s). Each T1 frame contains a T1 payload with 24 DS0 timeslots, one for each DS0 channel with 8 bits in each timeslot. Each T1 frame also has a T1 frame bit that identifies the start of the T1 frame, so that a T1 frame has a total size of 193 bits. This results in a data stream of 1.544 Mbps (8000 frames/sec 193 bits/frame).

A T1 superframe is a group of 12 T1 frames. Each superframe contains a frame bit section composed of 12 frame bits, and a payload section composed of 12 samples for each of the 24 DS0 channels. A T1 extended superframe (ESF) is a group of 24 T1 frames. Each ESF is composed of an ESF frame bit section that contains 24 frame bits, and an ESF payload section that contains 24 samples of each of the 24 DS0 channels.

Although T1 was developed for voice communications, it is not limited to voice communications. The physical line carrying the 24 channels does not care whether the channel timeslot contains digitized voice samples or digital computer data. Thus, a broader definition of a T1 link is a digital transmission link with a capacity of 1.544 Mbps.

Information concerning whether a channel is active, idle, ringing, etc., may be passed through the voice channel by borrowing, or robbing, one bit every $6^{th}$ frame. This process is called robbed bit signaling. Robbed bit signaling does not noticeably affect the quality of voice connections in a telephone network.

When robbed bit signaling is used and a voice channel is used to carry digital data, only 7 of the 8 bits in each frame can be counted upon to pass data through the network from one end to the other, as the $8^{th}$ bit is frequently modified as the robbed bit. This gives rise to a single DS0 channel carrying only 56 Kbps of data. An entire T1 link carrying digital data would carry 1.340 Mbps using this method. This is inefficient and for this reason a new standard for T1 transmission called Primary Rate ISDN (PRI) was developed to more efficiently move digital data through a T1 link.

The PRI format calls for a T1 link to not have robbed bit signaling. Instead, one of the 24 voice channels is dedicated for channel management (e.g. active, ringing, etc.) and is called the "D" channel. The other 23 channels, called bearer channels or "B" channels, may now use all 64 Kbps to carry digital data. An entire T1 link using PRI format can carry 1.430 Mbps. Industry standards frequently call this form of PRI 23B+D. Further efficiencies can arise when multiple T1 links between two end nodes exist. (An end node is a node where a call is originated or terminated; all other nodes along the entire link are used to only route the traffic through the telephone network). A single D channel in one link can carry all the necessary information for several T1 links. Two T1 links with a single D channel would be called 47B+D, and four T1 links with a single D channel would be called 95B+D. Some versions also carry a spare D channel in case the T1 link with the active D channel goes down.

The D channel carries High level Data Link Control (HDLC) messages about the B channels in all the T1 link(s) covered by that particular D channel. When a D channel carries an HDLC message it becomes known as the HDLC channel. Typically, the HDLC channel is the $24^{th}$ channel on a T1 link and occupies the $24^{th}$ timeslot in a T1 frame.

The HDLC channel is used by the DTE equipment at the two end nodes to transmit link management messages. Examples of these link management messages are call setup and call teardown. When user A at node 1 wants to setup a call with user B at node 2, $DTE_1$ and $DTE_2$ communicate system information to setup the call. This is done over the HDLC channel. Likewise, when either user A or user B terminates the call, $DTE_1$ and $DTE_2$ must communicate to tear down the call setup so the channel can be reused.

Another link management example is call blocking. If user B had previously notified the link management to block calls from user A, then the message from $DTE_2$ back to $DTE_1$ that user A is blocked would be carried over the HDLC channel. A further example is caller ID. If user B has caller ID, the phone number of user A will be carried over the HDLC channel and displayed to user B.

Since T1 is a synchronous TDM link, once a channel connection has been setup between two users, that channel is dedicated until the connection is torn down. This channel dedication is an inefficient use of the 1.544 Mbps of T1 link capacity. For example, assume channel #5 of the 24 T1 channels is set up between user A and user B. Channel #5 will carry all communication between user A and user B. If there is a pause in the communication between user A and user B (such as user A putting user B on hold) during the transmission of a particular T1 frame, then that particular T1 frame will carry an empty channel #5 timeslot. Even a short pause of one minute can lead to 480,000 T1 frames being transmitted with an empty channel #5 timeslot This is so even if channel #6 is being fully utilized by computer data at 64 Kbps. Because channel #5 is dedicated, the channel #6 user cannot send data over two channels (e.g. #5 and #6) for an effective rate of 128 Kbps.

Asynchronous Transfer Mode (ATM) is an asynchronous type of communications protocol. It is designed to be carried over the emerging fiber optical network, called the Synchronous Optical NETwork (SONET), although it can be carried over almost any communications link. The basic unit of ATM is the ATM cell. Each cell contains two parts; a header, which contains routing information, and a payload, which contains the data to be transported from one end node to another.

ATM is considered asynchronous because each node in the network does not know until after a cell arrives where it is intended to go. In a synchronous network, each timeslot is assigned a certain time when it is to arrive at each node. When it arrives will determine where a timeslot goes. Thus, the individual timeslots do not need to have routing information within them. The arrival of a particular ATM cell at a node, on the other hand, is not guaranteed to occur at a particular point in time.

There are a number of factors which makes ATM attractive to the telecommunications industry. One is the cost of the SONET transport mechanism. On a bit per bit basis, it is significantly less expensive than using metallic links by several factors of ten. The theoretical capacity of fiber is in excess of 20 tera bits per second (20 million million bits per second). Current technology is at 40 thousand million bits per second, and will soon increase to 160 thousand million bits per second. As technology improves, more information can be sent over each fiber optic buried in the ground.

On the other hand, metallic links that can span long distances are and reasonable to manufacture, have long ago reached their theoretical limits of roughly under 500 million bits per second, and are much bulkier than fiber optic links. The metallic link is also susceptible to rust and corrosion, whereas the fiber is relatively chemically inert. Because of signal attenuation (loss of signal strength as a signal travels down a link) on either type of link, repeaters which reamplify the signal are needed. Metallic links attenuate the signals more than do fiber links, so more repeaters for metallic links are needed than for fiber links for a given distance. For instance, a T1 link can span a maximum of just over one mile (6000 feet) before a repeater is needed. It is not unusual for fiber optic links to span 50 to 100 miles between repeaters.

For this reason, it is now cost effective for two end nodes of a T1 link to convert their T1 signals into ATM cells, transport it across a SONET network, and then reconvert back to T1 at the other end. At the destination node, an ATM receiver unloads the T1 frames from the ATM cells. The ATM receiver sends the T1 frames to a switch matrix where the DS0 channels are de-multiplexed and sent to their particular user destinations. This approach is referred to as T1 emulation over an ATM network.

A problem can occur in the ATM receiver during the unloading of the T1 frames from their respective ATM cells. Typically, the incoming ATM cells are stored in a buffer before the T1 frames are unloaded and sent to the switch matrix.

Flow problems occur when the incoming ATM cell rate differs from the rate that the switch matrix is demanding T1 frames. If the incoming ATM cell rate exceeds the rate of outgoing T1 frames, the buffer will eventually fill up. When this occurs, the delivery of T1 frames to the switch matrix will be interrupted and T1 frames will be lost. If the switch matrix requirements exceed the incoming ATM cell rate, then the buffer will eventually empty out, which may also lead to an interruption of T1 payload delivery. The condition that results when the buffer either fills to capacity or empties out because of flow control problems is a frame slip event.

When the emulated T1 link is carrying voice communications, the loss of a single T1 frame due to a frame slip has minimal effect on the quality of the voice communication between the link users if the call setup is already complete. This is because each T1 frame contains only one voice sample from each of the 23 channels, and 8000 T1 frames/sec are transmitted. (The $24^{th}$ channel is the HDLC channel.) Thus, the loss of one T1 frame, or even 20 T1 frames will not be noticed by the link users.

But a frame slip can have a significant effect on HDLC message processing when conventional methods are used to read the HDLC message. Conventional methods read the HDLC channel at the output of the switch matrix. In other words, conventional methods place the HDLC receiver at the output of the switch matrix so that HDLC timeslot is not read until after the T1 frame is demultiplexed. The HDLC message is then sent to an HDLC channel controller which interprets the message and makes control decisions. The conventional placement of the HDLC receiver makes HDLC message processing vulnerable to frame slips that occur in the ATM receiver because the ATM receiver is "upstream" from the switch matrix.

The HDLC message components will now be discussed to support the understanding of frame slip effects on conventional HDLC message processing. A single T1 frame carries only 1 byte of an HDLC message, and thus it takes multiple T1 frames to carry the entire HDLC message. Each HDLC message contains: an initial flag field, an address field, a control field, an information field, a frame check sequence field, and a final flag field. The initial and final flag fields delimit the beginning and end of the HDLC message. The information field carries the actual HDLC message. The frame check sequence (FCS) field carries a 16 bit or 32 bit Cylic Redundancy Check (CRC) which can used to detect bit errors in the HDLC message caused by the physical line.

The effect of a frame slip on conventional HDLC message processing will now be discussed. If a frame slip causes the loss of the initial flag field, a conventionally placed HDLC receiver will ignore the HDLC message because no notice was received. If a frame slip causes the loss or duplication of 1 byte of the information field, the system command represented by the digital data in the information field will be unintelligible. This is because the HDLC controller must refer to a table to decipher the system command represented by the information field. If 1 byte of the information field is lost, this will not be possible. If a frame slip causes the loss or duplication of 1 byte in the FCS field, the CRC test will fail. The HDLC controller ignores the HDLC message and requests message retransmission after a CRC test failure. If a frame slip causes the loss of the final flag field, then a conventionally placed HDLC receiver cannot realize the HDLC message has ended. This will eventually lead to a timeout error, which will cause the HDLC controller to reject the message and request re-transmission. Also, this could cause a conventionally placed HDLC receiver to ignore a second HDLC message because the initial flag of the second message was interpreted as the final flag of the first message. In some HDLC formats, a single flag can represent both the ending flag for one message and the beginning flag for the next. In this instance, the two messages will be interpreted as a single message, and both will be lost.

What is needed is a method and system of processing the HDLC message despite the occurrence of a frame slip event during the reception of an HDLC message.

SUMMARY OF THE INVENTION

The present invention generally relates to emulating a T1 communications link over an Asynchronous Transfer Mode (ATM) communications network. In particular, the present invention relates to a method and system for processing a High level Data Link Control (HDLC) message despite the occurrence of a frame slip event in an ATM receiver during the reception of the HDLC message. The ATM receiver is part of an ATM network that is emulating a T1 link.

The method comprises the steps of receiving an ATM cell that has traveled over the ATM network. Each ATM cell carries one or more T1 payloads. Each T1 payload carries a plurality of timeslots, wherein the HDLC timeslot is one of the plurality of timeslots. Next, the HDLC receiver reads the HDLC timeslot for each T1 payload subsequent to receiving the ATM cell, but prior to unloading the T1 payloads from the ATM cell. Next, each T1 payload is unloaded from the ATM cell subsequent to the reading of the HDLC timeslot. Next, the plurality of timeslots in each T1 payload are sent to a switch matrix, where the timeslots are de-multiplexed and sent to their particular user destinations. Next, the above steps are repeated for a plurality of ATM cells, whereby the HDLC message is carried in the HDLC timeslot over a plurality of ATM cells.

In one embodiment, exactly two T1 frames are packaged in each ATM cell that travels over the ATM network. This is done by carrying two T1 payloads in each ATM cell payload. The corresponding T1 frame bits are carried in the ATM cell header. In another embodiment, additional steps of analyzing the HDLC message received over the HDLC channel and transmitting a response based on the received HDLC message are performed.

One advantage of the present invention is that the HDLC timeslot is read no before each T1 payload is unloaded from the ATM cell. In this way, frame slips which occur during the unloading process do not effect accurate and complete processing of the HDLC message.

Further features and advantages of the present invention, as well as the structure and operation of the various embodiments of the present invention, are described in detail below with reference to the accompanying figures.

BRIEF DESCRIPTION OF THE FIGURES

The accompanying figures, which are incorporated herein and form part of the specification, illustrate the present invention and, together with the description, further serve to explain the principles of the invention and to enable a person skilled in the pertinent art to make and use the invention. In the figures:

FIG. 6 is a block diagram of a data terminating equipment (DTE) where the HDLC receiver is placed inside the ATM receiver.

The present invention is described with reference to the accompanying figures. In the figures, like reference numbers indicate identical or functionally similar elements. Additionally, the left-most digit(s) of a reference number identifies the figure in which the reference number first appears.

DETAILED DESCRIPTION OF THE PREFERRED EMBODIMENTS

Table of Contents

I. Example Enviromnent
II. T1 frame and T1 Extended Superframe
III. HDLC Message Structure
IV. ATM Cell
V. Carrying T1 Frames in ATM cells
VI. HDLC Message Processing at a DTE A. Overview of DTE operation B. Detailed description HDLC Message Processing
VII. Frame Slips A. Definition and Background B. Advantage of the Present Invention
VIII. E1 Emulation
IX. Conclusion I. Example Environment Before describing the present invention in further detail, it is helpful to describe an example environment in which the invention can be implemented. It is not intended that the invention be limited to the example environment. In fact, after reading the following description, it will become apparent to a person skilled in the relevant art how to implement the invention in alternate environments.

Figure 1:
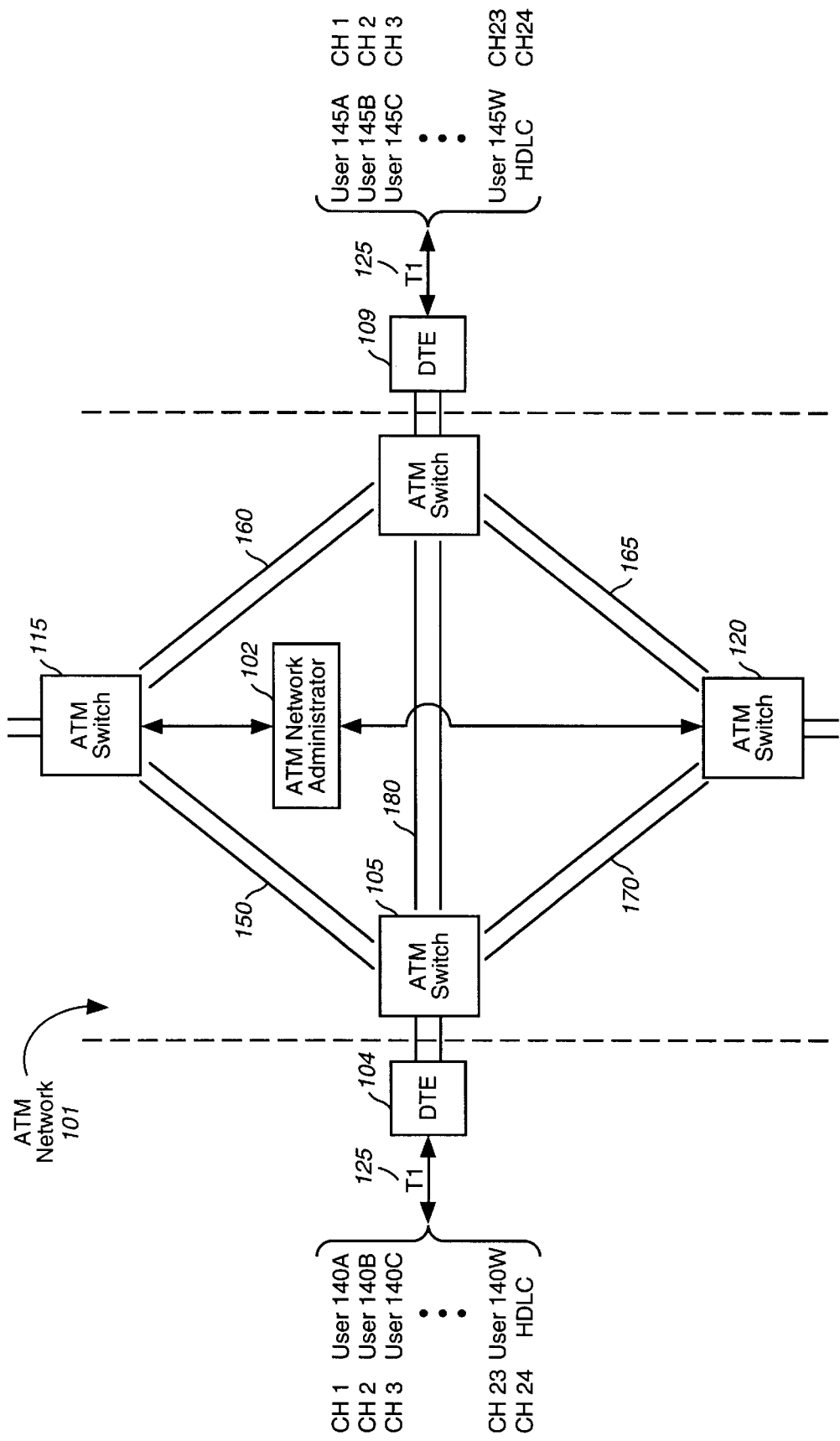
FIG. 1 is a block diagram showing T1 emulation over an ATM network.

One such environment is the use of an ATM network to emulate a T1 link. A simple illustration is shown in FIG. 1 where one or more users 140A–140W (23 users, 1 for each DS0 channel) connected to DTE 104 want to have voice or data communication with one or more users 145A–145W connected directly to DTE 109. This can be done over ATM network 101 by carrying a virtual T1 line (that is, it does not exist physically, but does conceptually) from DTE 104 and sending the T1 frames over ATM network 101 to DTE 109. DS0 channel #24 is a high level data link control channel (HDLC) used to carry call setup and tear down messages between DTE 104 and DTE 109.

DTE 104 packages the T1 frames in ATM cells and sends them to ATM switch 105. In one embodiment, ATM switch 105 determines the route to ATM switch 110 which is the most appropriate. Link 180 is clearly the most direct. But it may be that the level of existing data traffic on link 180 would require storage of the ATM cells before they can be sent on link 180. This may occur if network administrator 102 has directed that ATM switch 115 or 120 send cells on link 180. Also, link 180 may be non-operational at the moment for any number of reasons, such as a failed port on either end or anywhere in between, or a cut line.

Thus, ATM switch 105 may choose to send the ATM cells over link 150 to ATM switch 115 to avoid excessive traffic or route around a downed link. If so, ATM switch 115 reads the address in an ATM cell header and sends the ATM cells to ATM switch 110 via link 160. Alternatively, ATM switch 105 may choose to send ATM cells to ATM switch 120 via link 170. If so, ATM switch 120 reads the address in an ATM cell header and sends the ATM cells to ATM switch 110 via link 165. In another embodiment, ATM network administrator 102 determines the best route and instructs all ATM nodes between ATM switch 105 and ATM switch 110 how to route the call.

Regardless of which route was taken or how the decision to make the connection occurs, ATM switch 110 will route the T1 link to DTE 109.

II. T1 frame and T1 Extended Superframe

Figure 2:
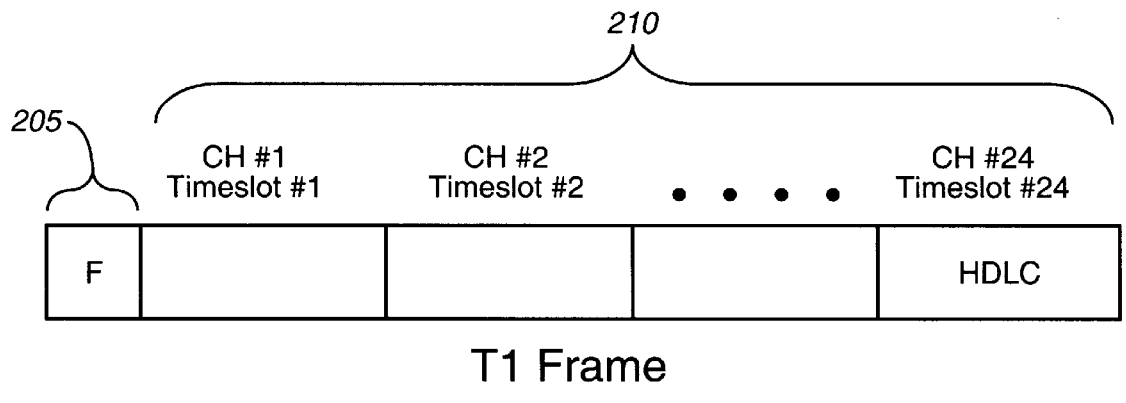
FIG. 2 is a diagram that illustrates the structure of a T1 frame.

FIG. 2 illustrates atypical T1 frame generated inside DTEs 104 or 109 in FIG. 1. The T1 frame consists of a T1 frame bit 205 and a T1 payload 210. T1 payload 210 consists of 24 DS0 timeslots, where each DS0 timeslot supports it respective DS0 channel by carrying one byte of a user message. T1 line 125 transmits 8000 T1 frames per second, which results in each of the 24 DS0 channels having a bit rate of 64 Kbps. Timeslot #24 in the T1 frame is used for the HDLC channel. In other words, an HDLC message is divided into one byte portions and placed in Timeslot #24 of the necessary number of T1 frames required to carry the message.

Figure 3:
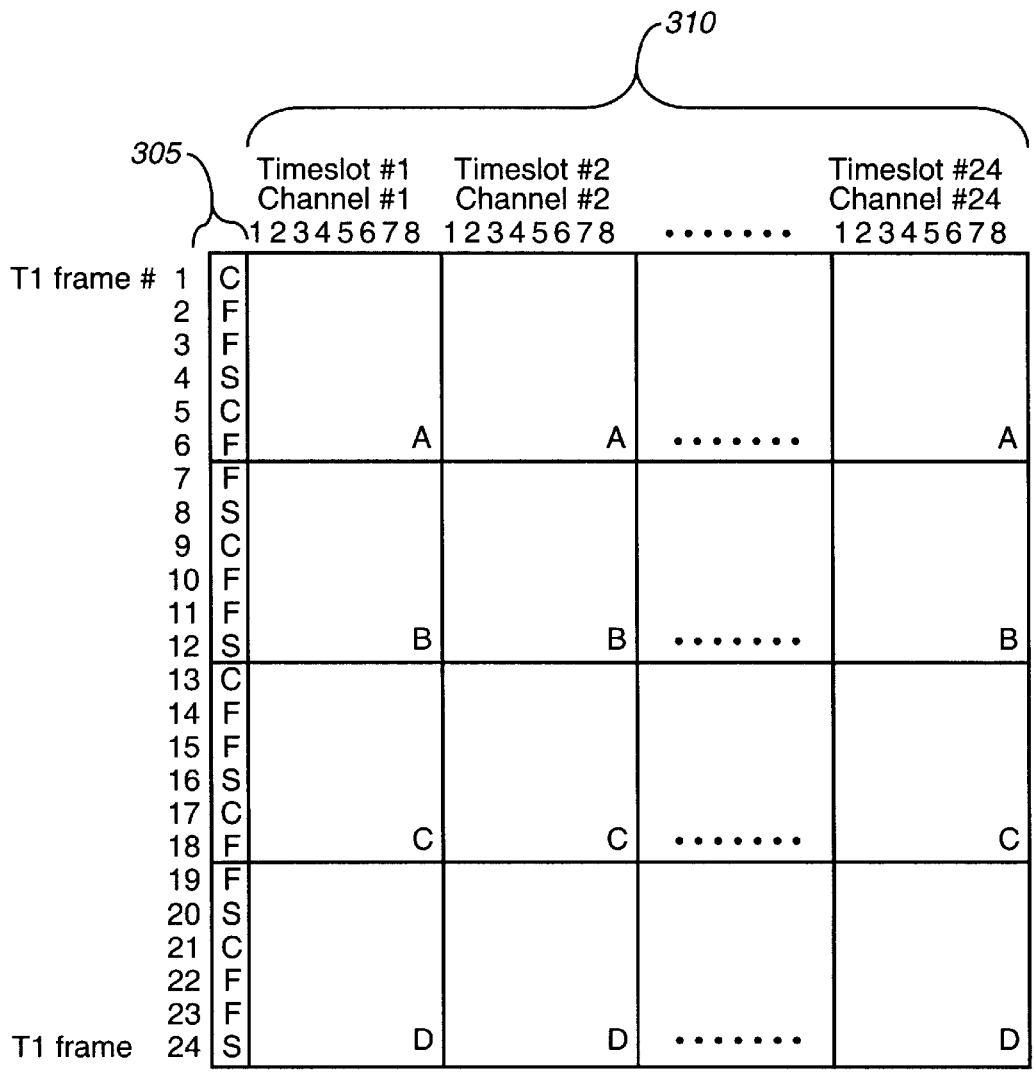
FIG. 3 is a diagram that illustrates the structure of a T1 Extended Superframe.

FIG. 3 represents an Extended Superframe (ESF), which is a group of 24 T1 frames that can be carried by T1 line 125. An Extended Superframe consists of frame bit section 305 and a payload section 310.

Frame bit section 305 consists of 24 frame bits that can be one of three different types. Six of the frame bits are synchronization bits ("S" bits) and are used by an overhead receiver to determine the start of an Extended Superframe. Six of the frame bits are error checking bits ("C" bits) that us the Cyclic Redundancy Check (CRC-6) method. The CRC-6 test discovers bit errors in the frame bit section 305 caused by the physical line during transmission. Twelve of the frame bits ("F" bits) are used for a Facilities Data Link channel (DL channel). If the CRC-6 test fails for a number of received ESFs, then a status message will be sent to the administrator of DTE 104 and DTE 109 over the DL channel to give notice of the CRC-6 failures. The DTE administrator (s) may dispatch a technician to inspect and repair the DTEs.

III. HDLC Message Structure

Figure 4:
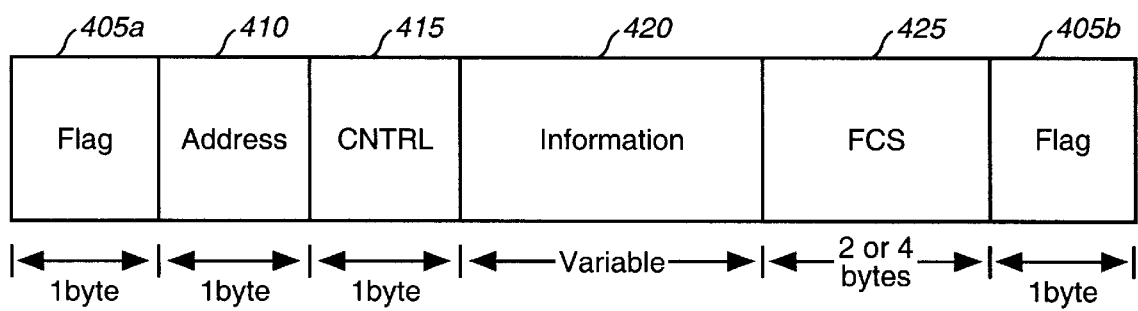
FIG. 4 is a diagram that illustrates the structure of an HDLC message.

FIG. 4 represents the field structure of atypical HDLC message sent over the HDLC channel. Fields 405a and 405b are one byte flag fields that delimit an HDLC message at both ends with a unique bit pattern (typically "01111110"). This pattern is unique in HDLC traffic in that normal traffic with five or more 1's are always followed with a stuffed bit, a zero, to prevent it from appearing to be a flag field. These are used to notify the HDLC receiver of the start and finish of an HDLC message. Field 410 is an address field that contains the destination address of the HDLC message. This field is not needed for point-to-point T1 links to identify different physical end points, but may be used to identify different logical end points within the same physical endpoint.

Field 420 is the information field, and contains the actual message that is to be communicated to the destination DTE. As discussed earlier, examples of the HDLC message carried within the information field are call setup, call teardown, call blocking, and caller id. The information field has a variable length depending on length of the message sent. Field 415 is the control field which notifies the destination DTE of the type of information field that will follow. Field 425 is the frame check sequence (FCS) field. A 16 bit or 32 bit Cyclic Redundancy Check (CRC) can be used in field 425 to detect bit errors caused by the physical line.

An HDLC message must be carried over multiple T1 frames. As seen by FIG. 4, each of the five HDLC fields is a minimum of one byte in size. Each T1 frame carries only one byte of an HDLC message in the HDLC timeslot. FCS field 425 alone can require four T1 frames to carry this field depending on the actual CRC test used. Thus, an HDLC message is divided into one byte portions and placed in timeslot #24 of the necessary number of T1 frames.

IV. ATM Cell

Figure 5A:
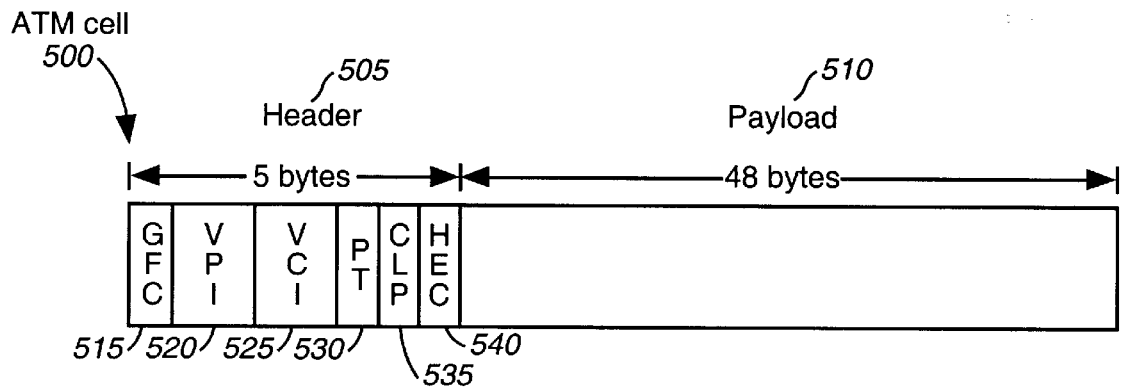
FIG. 5A is a diagram that illustrates the structure of an ATM cell.

FIG. 5A depicts the structure of the typical ATM cell sent over ATM network 101. ATM cell 500 consists of ATM header 505 and ATM payload 510. The ATM header 505 is 5 bytes in length and the ATM payload 510 is 48 bytes (or 384 bits) in length.

ATM header 505 contains 5 distinct fields. In general the ATM header 505 is used to identify the destination, cell type, and priority of the ATM cell. The ATM header fields are as follows: 4 bit generic flow control (GFC) field 515, 12 bit virtual path indicator (VPI) field 520, 16 bit virtual channel indicator (VCI) field 525, 3 bit payload type (PT) field 530, 1 bit cell loss priority (CP) field 535, and an 8 bit header error check (HEC) field 540.

GFC field 515 was originally intended to carry the initial ATM cell flow rate as set by DTE 104 in FIG. 1. (But this is not implemented). VPI field 520 and VCI field 525 are used to identify the destination address of a particular ATM cell. This allows ATM switches 115 and 120 to recognize that a particular ATM cell is destined for DTE 104 or DTE 109. PT field 530 indicates whether a cell contains user data (e.g. voice conversations), signaling data, or something else. CLP bit 535 indicates the relative priority of the cell. Lower priority cells are discarded before higher priority cells during intervals of congestion. HEC field 540 is used to detect errors in the header caused by the physical line during transmission.

As stated above, the GFC field 515 was originally intended to carry cell flow rate data, but this is not implemented. Cells that have a distinct GFC field 515 will have this field filled with all logical zeros. Any bits set to logic one in the GFC field is ignored. This embodiment is used for transmission of cell between ATM network 101 and end users. This is known as user network interface (UNI).

In one embodiment, GFC field 515 is merged with VPI field 520 to provide a larger 12 bit VPI field. The larger VPI field is used for transmission of cells between nodes of ATM network 101. This is known as network node interface (NNI).

V. Carrying T1 Frames in ATM cells

Figure 5B:
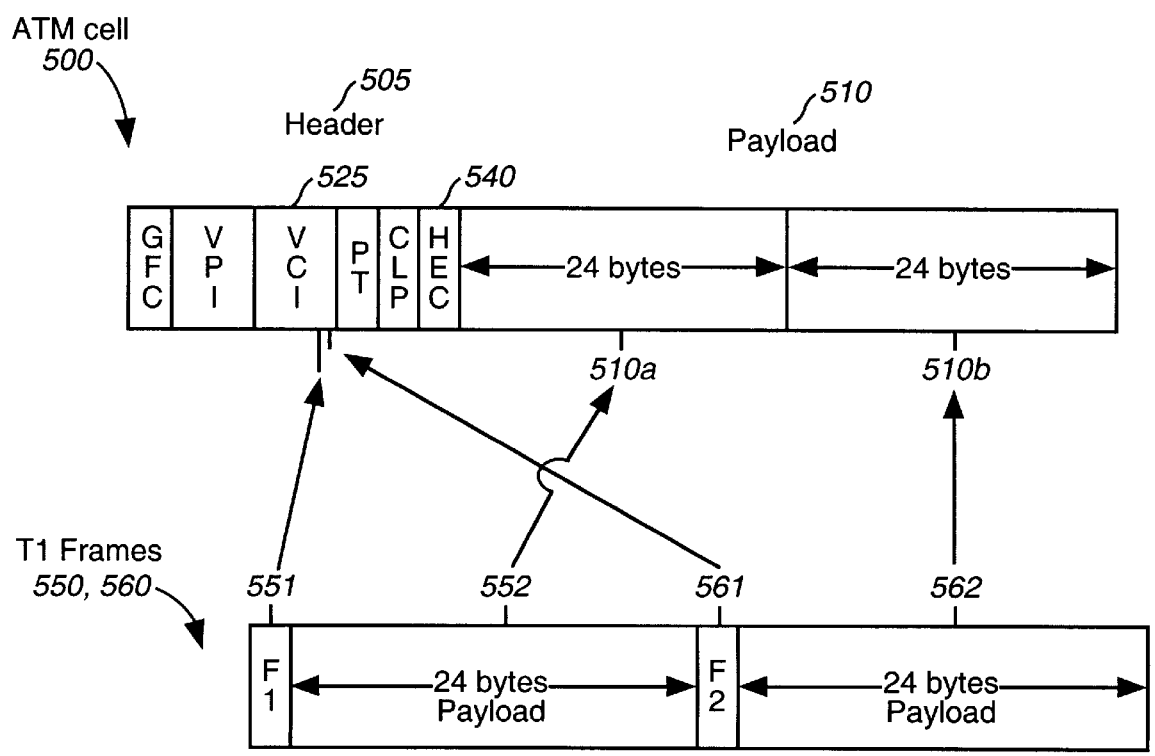
FIG. 5B is a diagram that illustrates a method of carrying exactly two T1 frames in a single ATM cell.

FIG. 5B illustrates one embodiment of how each ATM cell carries two T1 frames over ATM network 101. ATM cell 500 has an ATM header 505 and an ATM payload 510. T1 frame 550 has a T1 frame bit 551 and a T1 payload section 552. Likewise, T1 frame 560 has a T1 frame bit 561 and a T1 payload section 562. T1 payload sections 552 and 562 are both 24 bytes in size or 48 bytes total. ATM payload 510 is also 48 bytes in size, so that exactly two T1 payloads can fit within an ATM cell payload. In the present invention, ATM payload section 510a carries T1 payload 552. Likewise, ATM payload 510b carries T1 payload 562. ATM payload section 510a is the first 24 bytes of ATM payload 510. ATM payload section 510b is the second 24 bytes of ATM payload 510.

T1 frame bits 551 and 561 cannot be carried in the ATM payload 510. This is because T1 payloads 552 and 562 utilize the entire 48 byte capacity of ATM payload 510. Thus, the present invention carries the T1 frame bits 551 and 561 in the ATM cell header 505.

In one embodiment, T1 frame bits 551 and 561 replace the two least significant bits in VCI field 525 of the ATM header 505. VCI field 525 is 2 bytes in size and is one of two address fields in ATM header 505 (VPI field 520 being the other). ATM switches 115 and 120 use the address fields in ATM network 101 to route ATM cells to their proper destination DTE. By replacing the two least significant bits in VCI field 525 with T1 frame bits 551 and 561, the number of possible destination DTEs will be reduced, but not significantly.

In an alternate embodiment, T1 frame bits 551 and 561 replace any of the other bit locations of the VCI field 525. In another alternate embodiment, T1 frame bits 551 and 561 may replace bits in the VPI field 520.

In another alternate embodiment, ATM cell 500 carries exactly one T1 frame. In this embodiment, the T1 frame bit may be carried within the ATM header 505, or within the ATM payload 510 along with its T1 payload. This embodiment would not be as efficient as the embodiment that carries two T1 frames within each ATM cell. However, like the embodiment that carries two T1 frames within each ATM cell, this embodiment places the frame bit and each timeslot of the T1 frame within the same location of the ATM cell to make reception of the T1 frame easy.

In another alternate embodiment, ATM cell 500 carries fractional T1 frames. A fractional T1 link supports less than 24 DS0 channels. Correspondingly, a fractional T1 frame contains less than 24 timeslots in the fractional T1 payload. ATM cell 500 may carry more than two fractional T1 frames depending on the actual number of timeslots in the fractional payload. For example, ATM cell 500 may carry 4 fractional T1 frames, if the fractional payload contains only 12 timeslots. Both DTE know which timeslots are used and which are unused, and remove the unused timeslots before placing them in an ATM cell to increase the efficient use of the network. After receiving the cell, the DTE adds the unused timeslots back in to get a fill T1 signal.

VI. HDLC Message Processing at a DTE

Figure 7:
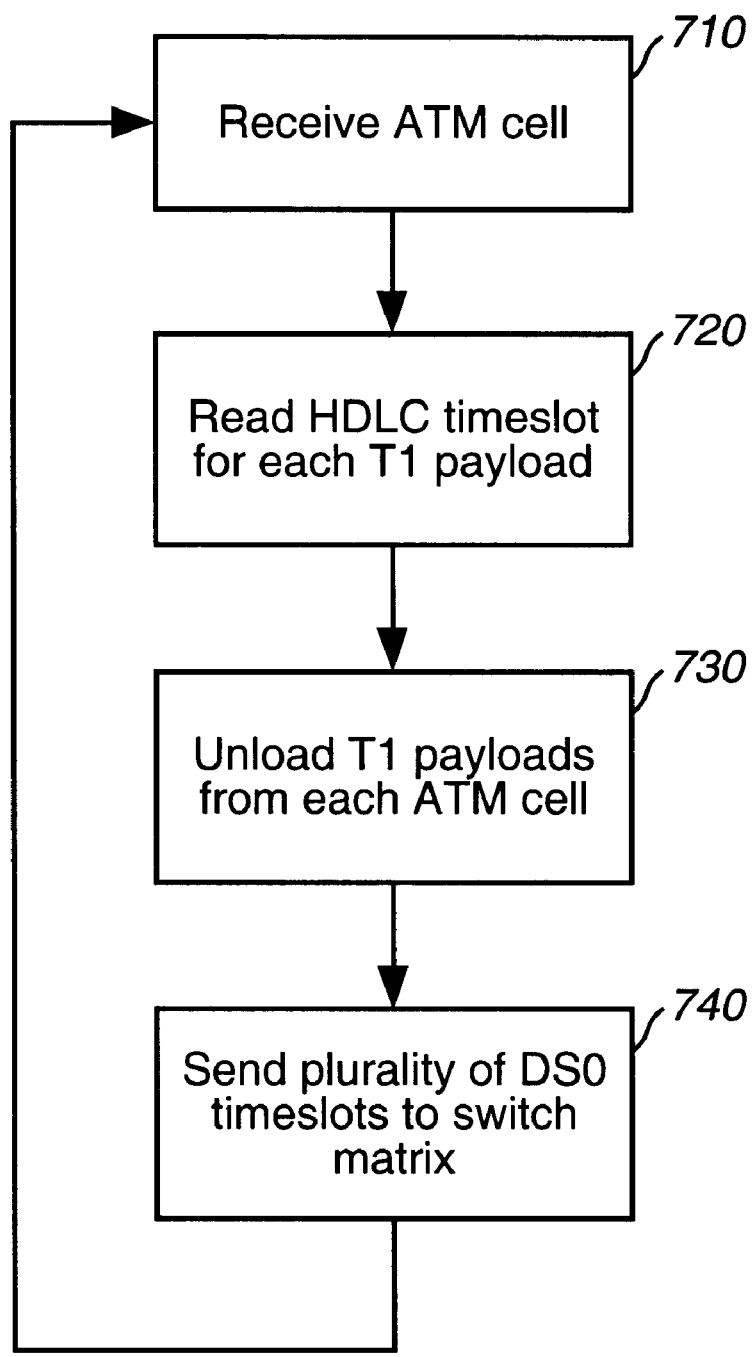
FIG. 7 is a flowchart that illustrates the basic steps of processing an HDLC message.

FIGS. 6 and 7 illustrate HDLC message processing in DTE 109 of FIG. 1 according to one embodiment of the present invention. FIG. 6 is a block diagram of HDLC channel processing including: SONET receiver 605, ATM receive 610, switch matrix 650, DTE CPU 655, HDLC channel controller 660, HDLC transmitter 665, switch matrix 670, ATM transmitter 675, overhead controller 680, and SONET transmitter 685. ATM receiver 610 includes: HDLC receiver 620, data framer 625, overhead receiver 630, receiver processor 615, buffer controller 645, cell buffer 635, and elastic store buffer 640. The operation of HDLC processing according to the present invention will be described further with respect to FIG. 7.

A. Overview of DTE operation

DTE 104 and 109 have full-duplex capability, meaning they can transmit and receive ATM cells simultaneously. During reception at DTE 109, ATM cells from DTE 104 arrive at DTE 109 embedded in a SONET signal 601. SONET receiver 605 unloads the ATM cells and sends them to ATM receiver 610 on line 606. In one embodiment, each ATM cell carries two T1 frames as shown in FIG. 5B.

As shown in FIGS. 6 and 7, ATM receiver 610 receives an ATM cell on line 606 (step 710 in FIG. 7). HDLC receiver 620 (inside ATM receiver 610) reads the HDLC timeslot of each T1 payload in the ATM cell (step 720). Next, ATM receiver 610 unloads two T1 payloads from the each ATM cell (step 730). Wherein, each T1 payload carries 24 DS0 timeslots including the HDLC timeslot. Next, ATM receiver 610 sends the DS0 timeslots to switch matrix 650 (step 740). Switch matrix 650 de-multiplexes the 24 DS0 timeslots in each T1 payload and sends to them they're the respective Users 145A–145W. The $24^{th}$ timeslot is the HDLC timeslot, which was read in step 720, and it goes nowhere. Having already been read by HDLC receiver 620, the HDLC channel can now disappear. It is useful to recall that a T1 link carries 8000 T1 frames/sec, so that each timeslot in a T1 frame only contains a small portion (or sample) of the entire message destined for Users 145A–145W.

During transmission, switch matrix 670 multiplexes messages that Users 145A–145W want to send to Users 140A–140W into the timeslots of the necessary number of T1 frames. The User 145A–145W message samples occupy 23 of the 24 timeslots in of the outgoing T1 frames. The $24^{th}$ timeslot is the HDLC timeslot. If there is an HDLC message to be sent to DTE 104, HDLC transmitter 665 generates the HDLC message and submits it to switch matrix 670. Switch matrix 670 multiplexes the HDLC message into the HDLC timeslot over the necessary number of T1 frames. Switch matrix 670 sends the resulting T1 frames to ATM transmitter 675. The generation and transmission of the HDLC channel requires no new features in that transmitted ATM cells will always be fully synchronized to switch matrix 670. There will be no frame slips between switch matrix 670 and ATM transmitter 675.

ATM transmitter 675 packages two T1 frames in each ATM cell and sends the ATM cells to SONET transmitter 685. SONET transmitter 685 packages the ATM cells in a SONET signal. SONET transmitter 685 sends SONET signal 686 to DTE 104 over ATM network 101. Packaging ATM cells inside SONET a signal and transmitting SONET signals is well known to those skilled in the art and need not be described in further detail.

One advantage of the invention over conventional HDLC processing is that the present invention reads the HDLC timeslot(s) before each T1 payload is unloaded from the ATM cell and sent to switch matrix 650. This is illustrated by FIG.7, where step 720 is performed before step 730. This is an advantage because frame slips occur during the unloading process. Conventional HDLC processing techniques read the HDLC timeslot after the switch matrix demultiplexes the T1 payload, which occurs after the T1 payload is unloaded from the ATM cell. Thus, conventional methods are vulnerable to frame slips, and an inopportune frame slip can cause an HDLC message to be disregarded. This would require HDLC message re-transmission which degrades T1 link efficiency.

B. Detailed description HDLC Message Processing

In one example of the present invention, ATM cells arrive at DTE 109 embedded in a SONET signal 601 (FIG. 6). SONET is a family of physical line standards used with high speed fiber optic lines. STS-1 is the slowest of the standards and can transport 28 T1 frames per STS-1 frame at a rate of 8000 STS-1 frames per second. This results in a bit transmission rate of 51.84 Mbps. Higher SONET transmission rates are available by scaling up the size of the SONET frame in whole multiples, but still transmitting 8000 SONET frames per second. SONET is but one physical line standard that can carry ATM cells over a distance. Those skilled in the art will recognize that other physical line standards could be used to carry ATM cells over a distance.

SONET receiver 605 receives SONET signal 601. SONET receiver 605 unloads the ATM cells from the SONET frames and sends the ATM cells on line 606 to ATM receiver 610 at a bit rate $r_1$. SONET receiver 605 also generates cell start signal 607 and clock signal 608, which are sent to receiver processor 615. Cell start signal 607 alerts receiver processor 615 that an ATM cell has been unloaded from a SONET frame. Clock signal 608 informs receiver processor 615 of the incoming ATM cell bit rate $r_1$. Unloading ATM cells from a SONET frame and generating control signals 607 and 608 are well known to those skilled in the art and does not need to be described in further detail.

Receiver processor 615 determines the arrival time of each ATM cell based on signals 607 and 608. Receiver processor 615 sends control signal 616 to data framer 625 to signal the arrival of each ATM cell and to provide the cell bit rate $r_1$. Similarly, receiver processor 615 sends control signals 617 and 618 to overhead receiver 630 and HDLC receiver 620, respectively. Data framer 625 forwards the control information to buffer controller 645 on line 626, along with synchronization information as will be discussed later.

In one embodiment, the arriving T1 frames are in an Extended Superframe (ESF) format as shown in FIG. 3. Data framer 625 receives the ATM cells on line 606a at a bit rate $r_1$. Data framer 625 does the ESF synchronization on the T1 frames within the initial ATM cells unloaded from anew SONET frame. This amounts to finding T1 frame #1 in FIG. 3. This is necessary because the first ATM cell may not start with T1 frame #1. It is necessary to find a T1 frame #1 in the initial ESFs in order for the overhead receiver 630 to effectively utilize the ESF frame bit section 305 in the following ESFs. Overhead receiver 630 cannot distinguish the three types of ESF frame bits ("S,C,F") until data framer 625 has completed ESF synchronization.

ESF synchronization is made much easier in the present invention because two T1 frames are contained within each ATM cell. Thus, data framer 625 knows exactly where to look in each ATM cell for the two ESF frame bits, since they are always in the same location of an ATM cell header. In one embodiment, the ESF frame bits replace the two least significant bits in the VCI field of the ATM cell header. ESF synchronization is done by looking for a distinct pattern of ESF synchronization frame bits ("S" bits in frame bit section 305 in FIG. 3). Once the pattern is found, T1 frame #1 can be located. Data framer 625 sends the synchronization information to overhead receiver 630 and to buffer controller 645. Data framer 625 also forwards the control information (cell start signal 607 and clock signal 608) from receiver processor 615 to buffer controller 645.

Next the ATM cells are sent to overhead receiver 630 on line 606b at a bit rate $r_1$. Upon receiving control signal 617, overhead receiver 630 reads and stores an entire ESF frame, comprising the ESF frame bit section and ESF payload section. When an entire ESF frame has been read and stored, overhead receiver 630 does the CRC error check on the ESF frame. The CRC error check detects bit errors in the ESF frame caused by physical line errors during cell transmission. Overhead receiver 630 sends the CRC error check results to the overhead controller 680.

Overhead controller 680 keeps track of the number of CRC test failures. If a threshold is met, then overhead controller 680 formulates a status message to be sent to network administrator 102. Overhead controller 680 instructs ATM transmitter 675 to insert the status message in the DL channel of the outgoing ESF(s). It takes several ESFs to carry the status message from overhead controller 680 since only 12 of 24 ESF frame bits are devoted to the DL channel. Upon receipt of the status message, network administrator 102 may dispatch a technician to inspect the physical lines in ATM network 101.

Next, the ATM cells are sent to HDLC receiver 620 on line 606c at bit rate $r_1$. Upon receiving control signal 618, HDLC receiver 620 reads the two HDLC timeslots carried within each ATM cell. HDLC receiver 620 knows exactly where to find each HDLC timeslot because control signal 618 marks the start of each ATM cell and the bit rate $r_1$, and the ATM payload starts after the standard 5-byte ATM cell header. Each ATM payload contains exactly two T1 payloads, and the HDLC timeslot is always the $24^{th}$ timeslot in each T1 payload. Thus, the two HDLC timeslots occupy the $29^{th}$ and $53^{rd}$ bytes in each ATM cell.

HDLC receiver 620 reads each HDLC timeslot searching for an HDLC flag byte, which announces the time in between HDLC messages. Once a flag byte is detected, HDLC receiver 620 waits until it no longer sees flag bytes. This indicates that the start of an HDLC message has occurred. It collects the HDLC message over the ATM cells between the first flag byte and a second flag bytes. The second flag byte signals the end of that particular HDLC message, and the start of the time between that particular HDLC message and the start of the next. As discussed earlier, examples of an HDLC message carried within the information field are call setup, call teardown, call blocking, and caller id. HDLC receiver 620 then performs a CRC error check on the FCS field of the HDLC message. The HDLC CRC error check is separate and distinct from the CRC check performed by overhead receiver 630 on the ESF frame bits.

In another embodiment, HDLC receiver scans and stores the HDLC timeslots in each ATM cell. HDLC receiver 620 places a number of HDLC timeslots together to form an HDLC data stream. HDLC receiver 620 reads each HDLC timeslot in the HDLC data stream searching for an HDLC flag byte. Once a flag byte is detected, HDLC receiver 620 waits until it no longer sees flag bytes. This indicates that the start of an HDLC message has occurred. It collects the HDLC message until a second flag byte is detected, which signals the end of that particular HDLC message. The CRC error check is then preformed on the FCS field of the HDLC message.

HDLC receiver 620 sends the HDLC message and the CRC test results to HDLC controller 660. If the CRC test passes, HDLC controller 660 analyzes the message and formulates a response. If the CRC test fails, the response is to either do nothing or else ask the other end to resend the HDLC message. HDLC controller 660 sends the response to HDLC transmitter 665. HDLC transmitter 665 generates the response and submits it to switch matrix 670.

Switch matrix 670 multiplexes the HDLC response into the HDLC timeslot of the necessary number of outgoing T1 frames. As discussed earlier, switch matrix 670 also multiplexes 23 DS0 message samples from Users 145A–W into their respective timeslots of the outgoing T1 frames. Switch matrix 670 sends the outgoing T1 frames to ATM transmitter 675. ATM transmitter 675 packages two T1 frames in each ATM cell and sends the ATM cells to SONET transmitter 685. This is but one embodiment. An alternate embodiment would be to package only one T1 frame in each ATM cell.

Next the received ATM cells are sent to cell buffer 635 on line 606d at a bit rate $r_1$. Cell buffer 635, elastic store buffer 640, buffer controller 645, DTE CPU 655 work together to unload the T1 payloads from the ATM cells and send them to switch matrix 650 at a bit rate $r_2$, where bit rate $r_2$ is set by switch matrix 650. DTE CPU 655 monitors the $r_2$ requirement and notifies buffer controller 645. Buffer controller 645 programs a shift register (not shown) in elastic store buffer 640 to operate at $r_2$.

The initial ATM cells from a new SONET frame are stored in cell buffer 635. Buffer controller 645 monitors the available storage capacity of cell buffer 635. When a threshold level is reached, buffer controller 645 instructs the cell buffer 635 to initiate transfer of T1 payloads to elastic store buffer 640. Cell buffer 635 transfers two T1 payloads in parallel to elastic store buffer 640 via lines 637a and 637b. The shift register (not shown) in elastic store buffer 640 shifts the two T1 payloads out at a rate $r_2$ and sends them to switch matrix 650 on line 641. Once the elastic store buffer 640 has cleared, buffer controller 645 directs cell buffer 635 to send the next pair of T1 payloads from the next ATM cell to the elastic store buffer 640 and the process is repeated.

Incoming ATM cells on line 606d arrive at bit rate $r_1$ that is generally asynchronous with the bit rate $r_2$ that T1 payloads are sent to switch matrix 650 on line 641. This results in the need for the two buffers. Cell buffer 635 stores the incoming cells at bit rate $r_1$, and elastic store buffer 640 sends the DS0 timeslots to the switch matrix 650 at a bit rate $r_2$. Buffer controller 645 controls the transfer of T1 payloads from cell buffer 635 to elastic store buffer 640.

Sending exactly two T1 payloads from cell buffer 635 to elastic store buffer 640 is but one embodiment. In another embodiment, the number of T1 payloads sent between the cell buffer 635 and the elastic store buffer 640 may be an integer number other than two. If the ATM cells 606d are carrying fractional T1 frames, then the number of T1 payloads transferred may be greater than two.

In another embodiment, cell buffer 635 may send a fraction of a T1 payload to elastic store buffer 640. In this embodiment cell buffer 635 would have to send several transfers per frame to elastic store buffer 640. The advantage of this embodiment is that the number of bits involved in the transfer is smaller, reducing the number of shift registers, buffers, and the width of the cell buffer 635, which will reduce the cost of implementation.

VI. Frame Slips

A. Definition and Background

As stated above, the ATM cells are stored in cell buffer 635 before the T1 payloads are unloaded from the ATM cells and sent to elastic store buffer 640. Initially, the cell buffer 635 will not start sending T1 payloads to elastic store buffer 640 until cell buffer 635 is filled to 50% of its storage capacity. If the incoming cell bit rate $r_1$ is equal to the payload bit rate $r_2$ (set by switch matrix 650), then cell buffer 635 will continuously operate at the 50% capacity level. However, if $r_1$ is higher than $r_2$, then cell buffer 635 will eventually fill to capacity. When this occurs, buffer controller 645 will instruct cell buffer 635 to dump a T1 frame so that more may be accepted.

If the $r_1$ is lower than $r_2$, then cell buffer 635 will eventually empty out. When this occurs, cell buffer 635 suspends delivery of T1 payloads to elastic store buffer 640 until cell buffer 635 refills to 50% of its capacity level. During this time, elastic store buffer 640 may duplicate the last T1 payload in its shift register. Elastic store buffer 640 continuously sends the duplicated payload to switch matrix 650 until cell buffer 635 refills to the 50% level.

In an alternate embodiment, cell buffer 635 will send a T1 frame to elastic store buffer 640 as soon as one is available within it.

A frame slip event is the T1 frame dump that results when cell buffer 635 fills to capacity, or the payload duplication that results when the cell buffer 635 has emptied out.

When the ATM network 101 is emulating a T1 link carrying voice communications, latency must be kept to a minimum. Latency variation is the variation in the delay of the arrival of a cell at a DTE. Latency variations occur when traffic in the ATM network changes, increasing or reducing the delay an ATM cell has to wait to be transmitted from one port to another through the ATM cloud. Latency is compensated for by making the cell buffer as big as is necessary so that, in a network where DTE 104 and DTE 109 are running synchronous to each other, no frame slips will occur.

Real time users of a T1 voice link will not tolerate noticeable transmission delay. This necessitates that the size of cell buffer 635 be kept to a minimum. But a small cell buffer is more susceptible to frame slips than a large cell buffer because a small cell buffer will fill up or empty out faster than a large cell buffer. In one embodiment, the capacity of cell buffer 635 is 8 ATM cells. Thus, the optimum capacity operating point is with 4 ATM cells in the cell buffer 635 for certain voice communication applications. The present invention is not so limited however, as a buffer capacity other than 8 ATM cells could be used when the emulated T1 link is carrying voice communications.

In alternate embodiment, the capacity of cell buffer 635 is set by a systems administrator. This capacity is determined by the maximum latency that can be seen from DTE 104 to DTE 109. The system administrator calculates the latency and sizes the cell buffer 635 accordingly.

In an alternate embodiment, the T1 link is carrying non-real time communications and delay is not important. Typically, this involves data communications. In this case, the capacity of cell buffer 635 can be specified very large to reduce the chance of frame slips from occurring. While frame slips are tolerable in voice communications, data users have to drop entire packets of data and re-transmit the dropped packets when a frame slip occurs. A large cell buffer 635 can not only absorb large latency variations, but for significant lengths of time where DTE 104 and DTE 109 are running asynchronously, prevent frame slips. A cell buffer 635 of 256 frames of depth will see only 1 or 2 frame slips a day if DTE 104 and DTE 109 are self timing off of Stratum 3 oscillators, a common internal timing source when external timing sources are absent.

B. Advantage of the Present Invention

An advantage of the present invention is that frame slips do not effect the processing of an HDLC message. The present invention places the HDLC receiver inside ATM receiver 610, which is "upstream" from switch matrix 650. As seen in FIG. 6, HDLC receiver 620 is placed so the HDLC timeslot of each T1 payload is read before the T1 payloads are unloaded from an ATM cell. Frame slips occur during the unloading of the T1 payloads from the ATM cells in cell buffer 635. When frame slips occur in cell buffer 635, they occur after HDLC receiver 620 has read the HDLC timeslot. Thus, frame slips do not affect the processing of the HDLC message.

VIII. E1 Emulation

The present invention has been described in the environment of ATM network that is emulating a T1 link. Those skilled in the art will recognize that the invention is also useful in the environment of an ATM network emulating an E1 link. E1 is a European voice communications standard that is very similar to T1. The difference is that an E1 link can carry 30 distinct voice grade channels, whereas a T1 link can carry 24 distinct voice grade channels. An E1 link transmits 8000 frames/sec just as a T1 link does.

An E1 frame carries 32 DS0 timeslots in an E1 payload, whereas a T1 frame carries 24 DS0 timeslots in a T1 payload. In an E1 frame, the HDLC or signaling timeslot is the $31^{st}$ timeslot in the E1 payload, and a framing pattern is carried in the 32nd. When the invention is practiced in the environment of an ATM network emulating an E1 link, only one E1 frame is carried in each ATM cell, although two or more fractional E1 frames can be carried if sufficient unused timeslots exist.

The present invention has been described with respect to emulating a T1 or E1 link, however, the present invention is not so limited. As would be apparent to a person skilled in the art, the present invention can be used in an ATM network emulating any synchronous or asynchronous link including, but not limited to, a T1 or E1 link.

IX. Conclusion

While various embodiments of the present invention have been described above, it should be understood that they have been presented in a way of example only, and not limitation. It will be understood by those skilled in the art that the various changes in form and details may be made therein without departing from the spirit and scope of the present invention as defined in the appended claims. Thus, the breadth and scope of the present invention should not be limited by any of the above-described exemplary embodiments, but should be defined only in accordance with the following claims and their equivalents.

What is claimed is:

1. A method of processing a High level Data Link Control (HDLC) message, the method comprising the steps of:
   (1) receiving an ATM cell that has traveled over an ATM network; wherein the ATM cell carries one or more T1 payloads, wherein each T1 payload contains a plurality of timeslots, wherein an HDLC timeslot is one of the plurality of timeslots;
   (2) reading the HDLC timeslot for each T1 payload subsequent to step (1) but prior to step(3);
   (3) unloading the T1 payload from the ATM cell;
   (4) sending the plurality of timeslots in each T1 payload to a switch matrix; and
   (5) repeating steps (1)–(4) for a plurality of ATM cells, whereby the HDLC message is carried in the HDLC timeslot over the plurality of ATM cells, whereby the HDLC message is processed despite the occurrence of a frame slip event.

2. The method of claim 1, further comprising the steps of:
   (6) checking the HDLC message for a bit error;
   (7) analyzing the HDLC message; and
   (8) transmitting a response based on the HDLC message.

3. The method of claim 1, wherein the one or more T1 payloads are two T1 payloads.

4. The method of claim 1, wherein the one or more T1 payloads are one or more fractional T1 payloads.

5. The method of claim 1, further comprising the steps of:
   (6) synchronizing a plurality of Extended Superframes (ESF);
   (7) reading an ESF frame; and
   (8) checking the ESF frame for a bit error.

6. The method of claim 1, wherein step (3) comprises the steps of:

(a) storing the ATM cell in a cell buffer; and
   (b) sending the one or more T1 payloads to an elastic store buffer.

7. A system for processing a High level Data Link Control (HDLC) message, the system comprising:
   receiving means for receiving an ATM cell that has traveled over an ATM network, wherein said ATM cell carries one or more T1 payloads, wherein each T1 payload contains a plurality of timeslots, wherein an HDLC timeslot is one of said plurality of timeslots;
   reading means for reading said HDLC timeslot for each T1 payload subsequent to said receiving means but prior to an unloading means;
   unloading means for unloading each T1 payload from said ATM cell; and
   sending means for sending said plurality of timeslots to a switch matrix; and whereby,
   said HDLC message is carried in said HDLC timeslot over a plurality of ATM cells, whereby said HDLC message is processed despite the occurrence of a frame slip event.

8. The system of claim 7, further comprising:
   checking means for checking said HDLC message for a bit error;
   analyzing means for analyzing said HDLC message; and
   transmitting means for transmitting a response based on said HDLC message.

9. The system of claim 7, wherein said one or more T1 payloads are two T1 payloads.

10. The system of claim 7, wherein said one or more T1 payloads are one or more fractional T1 payloads.

11. The system of claim 7, further comprising:
    synchronizing means for synchronizing a plurality of Extended Superframes (ESF);
    reading means for reading an ESF frame; and
    checking means for checking said ESF frame for a bit error.

12. The system of claim 7, wherein said unloading means comprises:
    storing means for storing said ATM cell in a cell buffer; and
    sending means for sending said one or more T1 payloads to an elastic store buffer.

13. A method of processing a High level Data Link Control (HDLC) message, the method comprising the steps of:
    (1) receiving an ATM cell that has traveled over an ATM network; wherein the ATM cell carries one E1 payload, wherein each E1 payload contains a plurality of timeslots, wherein an HDLC timeslot is one of said plurality of timeslots;
    (2) reading the HDLC timeslot for the E1 payload subsequent to step (1) but prior to step (3);
    (3) unloading the E1 payload from the ATM cell;
    (4) sending the plurality of time slots in the E1 payload to a switch matrix; and
    (5) repeating steps (1)–(4) for a plurality of ATM cells, whereby the HDLC message is carried in the HDLC timeslot over the plurality of ATM cells, whereby the HDLC message is processed despite the occurrence of a frame slip event.

14. The method of claim 13, further comprising the steps of:
    (6) checking the HDLC message for a bit error;

(7) analyzing the HDLC message; and (8) transmitting a response based on the HDLC message.

15. The method of claim 13, further comprising the steps of:
   (6) synchronizing a plurality of Extended Superframes (ESFs);
   (7) reading an ESF frame; and
   (8) checking the ESF frame for a bit error.

16. The method of claim 13, wherein step (3) comprises the steps of:
   (a) storing the ATM cell in a cell buffer; and
   (b) sending the E1 payload to an elastic store buffer.

17. A method of processing a High level Data Link Control (HDLC) message, the method comprising the steps of:
   (1) receiving an ATM cell that has traveled over an ATM network; wherein the ATM cell carries one or more payloads, wherein each payload contains a plurality of timeslots, wherein an HDLC timeslot is one of said plurality of timeslots, wherein the ATM network is emulating a communications link;
   (2) reading the HDLC timeslot for each payload subsequent to step (1) but prior to step (3);
   (3) unloading each payload from the ATM cell; and
   (4) repeating steps (1)–(3) for a plurality of ATM cells, whereby the HDLC message is carried in the HDLC timeslot over the plurality of ATM cells, whereby the HDLC message is processed despite the occurrence of a frame slip event.

18. The method of claim 17, wherein the communications link comprises a time division multiplexed (TDM) link.

19. The method of claim 18, wherein the TDM link comprises at least one of a T1 and E1 link.

* * * * *